(12) United States Patent
Higashi

(10) Patent No.: US 9,630,511 B2
(45) Date of Patent: Apr. 25, 2017

(54) VEHICLE-TO-GRID SYSTEM WITH POWER LOSS COMPENSATION

(71) Applicant: Nissan North America, Inc., Franklin, TN (US)

(72) Inventor: Kazuyuki Higashi, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 350 days.

(21) Appl. No.: 14/197,755

(22) Filed: Mar. 5, 2014

(65) Prior Publication Data

US 2015/0255985 A1    Sep. 10, 2015

(51) Int. Cl.
| | |
|---|---|
| *G05D 3/12* | (2006.01) |
| *B60L 11/18* | (2006.01) |
| *H02J 3/32* | (2006.01) |
| *H02J 3/46* | (2006.01) |
| *H02J 13/00* | (2006.01) |
| *H02J 7/00* | (2006.01) |

(52) U.S. Cl.
CPC ........... *B60L 11/18* (2013.01); *H02J 3/32* (2013.01); *H02J 3/46* (2013.01); *H02J 13/0006* (2013.01); *H02J 7/0013* (2013.01)

(58) Field of Classification Search
CPC ..... B60L 11/18; H02J 3/32; H02J 3/46; H02J 13/0006; H02J 7/0013
See application file for complete search history.

(56) References Cited

U.S. PATENT DOCUMENTS

| | | | |
|---|---|---|---|
| 7,740,092 B2 | 6/2010 | Bender | |
| 7,747,739 B2 | 6/2010 | Bridges et al. | |
| 7,928,693 B2 | 4/2011 | Hafner et al. | |
| 7,956,570 B2 * | 6/2011 | Lowenthal | B60L 11/1816 320/104 |

(Continued)

FOREIGN PATENT DOCUMENTS

| | | |
|---|---|---|
| CN | 201752076 U | 2/2011 |
| CN | 201752077 U | 2/2011 |

(Continued)

OTHER PUBLICATIONS

Dehaghani et al. "On the Inefficiency of Vehicle-to-Grid (V2G) Power Flow: Potential Barriers and Possible Research Directions", 2012 IEEE, 5 pages.*

(Continued)

*Primary Examiner* — Van Nguyen
(74) *Attorney, Agent, or Firm* — Young Basile Hanlon & MacFarlane, P.C.

(57) ABSTRACT

A vehicle-to-grid system connected to a power grid includes a first vehicle group of one or more vehicles connected to the power grid, a second vehicle group of one or more vehicles connected to the power grid, and a vehicle-to-grid controller. The vehicle-to-grid controller causes each vehicle from the second vehicle group to supply electrical power to the power grid at a nominal frequency and at an adjusted amplitude, and causes each vehicle from the first vehicle group to supply electrical power to the power grid at an adjusted frequency that is different than the nominal frequency and at a nominal amplitude that is different than the adjusted amplitude.

17 Claims, 5 Drawing Sheets

(56) References Cited

U.S. PATENT DOCUMENTS

| | | | |
|---|---|---|---|
| 8,138,715 B2* | 3/2012 | Lowenthal | B60L 11/1816 320/104 |
| 8,183,826 B2* | 5/2012 | Tuffner | H02J 7/34 320/107 |
| 8,314,587 B2 | 11/2012 | White et al. | |
| 8,432,131 B2* | 4/2013 | Lowenthal | B60L 11/1816 320/109 |
| 8,450,967 B2* | 5/2013 | Lowenthal | B60L 11/1816 320/104 |
| 8,478,452 B2 | 7/2013 | Pratt et al. | |
| 8,509,976 B2 | 8/2013 | Kempton | |
| 8,643,330 B2 | 2/2014 | Nergaard et al. | |
| 8,779,720 B2* | 7/2014 | Gaul | H02J 3/24 320/104 |
| 8,922,066 B2* | 12/2014 | Kesler | B60L 11/1812 307/104 |
| 8,928,276 B2* | 1/2015 | Kesler | H02J 17/00 307/104 |
| 9,263,968 B2* | 2/2016 | Potts | H02M 3/33584 |
| 2004/0062059 A1* | 4/2004 | Cheng | B60L 11/1814 363/17 |
| 2006/0250902 A1* | 11/2006 | Bender | B60K 6/46 369/1 |
| 2007/0282495 A1* | 12/2007 | Kempton | B60L 8/00 701/22 |
| 2009/0216387 A1 | 8/2009 | Klein | |
| 2010/0109604 A1 | 5/2010 | Boys et al. | |
| 2011/0106336 A1 | 5/2011 | Eikeland et al. | |
| 2011/0148356 A1* | 6/2011 | Lowenthal | B60L 11/1816 320/109 |
| 2011/0276194 A1 | 11/2011 | Emalfarb et al. | |
| 2012/0133337 A1 | 5/2012 | Rombouts et al. | |
| 2012/0249068 A1 | 10/2012 | Ishida | |
| 2012/0262002 A1* | 10/2012 | Widmer | H04B 5/0037 307/104 |
| 2013/0057200 A1* | 3/2013 | Potts | H02M 3/33584 320/107 |
| 2013/0057209 A1 | 3/2013 | Nergaard et al. | |
| 2013/0138369 A1 | 5/2013 | Papana et al. | |
| 2013/0173331 A1 | 7/2013 | Mohagheghi et al. | |
| 2013/0179061 A1 | 7/2013 | Gadh et al. | |

FOREIGN PATENT DOCUMENTS

| | | |
|---|---|---|
| CN | 102163856 A | 8/2011 |
| CN | 202068223 U | 12/2011 |
| KR | 20130063816 A | 6/2013 |
| WO | 2012084196 A2 | 6/2012 |
| WO | 2013041656 A2 | 3/2013 |
| WO | 2013113112 A1 | 8/2013 |

OTHER PUBLICATIONS

Ahmad et al. "Profit Determination for Vehicle-to-Grid (V2G) Operation in Smart Grid Environment", 2013 IEEE, pp. 758-763.*

Yilmaz et al. "Review of Benefits and Challenges of Vehicle-to-Grid Technology", 2012 IEEE, pp. 3082-3089.*

Gao et al. "Loss Analysis of Vehicle-to-Grid Operation", 2010 IEEE, 6 pages.*

Gross, G., Landi, M.; "Measurement of a health index for Li-Ion batteries", IEEE Instrumentation and Measurement Technology Conference, p. 177-182, May 9, 2013, Proceedings, Article No. 6555405.

Han, S., Han, S., Sezaki, K.; "Development of an Optimal Vehicle-to-Grid Aggregator for Frequency Regulation"; IEEE Transactions on Smart Grid, vol. 1, No. 1, Jun. 2010, pp. 65-72.

Wang, Z., Wang, S.; "The Key Technical Research on V2G System", Applied Mechanics and Materials, vol. 313-314, Mar. 2013.

Mullen, S.; "Plug-In Hybrid Electric Vehicles as a Source of Distributed Frequency Regulation", Sep. 2009, Google Scholar.

Gould, C., Wang, J., Stone, D., Foster, M.; "EV/HEV Li-ion battery modelling and State-of-Function determination", 2012 International Symposium on Power Electronics, Electrical Drives, Automation and Motion (SPEEDAM 2012), 353-8, Jun. 20, 2012.

Liu, G., Ouyang, M., et al., "Online Monitoring of Lithium-ion Battery Aging Effects by Internal Resistance Estimation in Electric Vehicles", Proceedings of the 31st Chinese Control Conference, Jul. 25-27, 2012, Hefei, China.

Meissner, E., Richter, G., "The challenge to the automotive battery industry: the battery has to become an increasingly integrated component within the vehicle electric power system", Journal of Power Sources 144 (2005) 438-460.

* cited by examiner

VEHICLE-TO-GRID SYSTEM WITH POWER LOSS COMPENSATION

BACKGROUND

Electrical power is delivered from power generation facilities (i.e. power plants) to consumers by a system of transmission lines and transmission facilities referred to as a power grid. Power generation facilities generate electrical power at a near constant rate. Demand for electrical power, however, fluctuates. To address this issue, power storage facilities are connected to the power grid. During times at which the amount of electrical power that is generated exceeds the amount of electrical power that is consumed, power is stored by the power storage facilities. The power storage facilities return power to the power grid during times at which the demand for electrical power exceeds the amount being generated. Many different systems are used to store electrical power, including systems that store power by pumping water, compressing gases, charging batteries, and spinning flywheels.

Currently, electric vehicles are becoming common. Electric vehicles commonly include battery packs that are charged when the vehicle is not in use. Vehicles are commonly parked most of the time, and in the case of electric vehicles, the vehicle is connected to a charging system for much of the time it is parked. Vehicle-to-grid systems intend to take advantage of this situation by utilizing the batteries of electric vehicles for grid power storage, operating in a manner similar to traditional power storage facilities. Thus, in a vehicle to grid system, charging is managed, to the extent practical, such that charging occurs primarily when overall demand for electrical power from the grid is low. During peak demand times, electrical power can be returned to the grid from the batteries of the electric vehicle. Power losses can, however, occur during return of electrical power to the grid from the batteries of the electric vehicle, which diminishes the benefits of participation in the vehicle-to-grid system by the electric vehicle.

SUMMARY

The disclosure relates to power loss compensation in vehicle-to-grid systems.

One aspect of the disclosed embodiments is a vehicle-to-grid system that is connected to a power grid and includes a first vehicle group of one or more vehicles connected to the power grid, a second vehicle group of one or more vehicles connected to the power grid, and a vehicle-to-grid controller. The vehicle-to-grid controller causes each vehicle from the second vehicle group to supply electrical power to the power grid at a nominal frequency and at an adjusted amplitude, and causes each vehicle from the first vehicle group to supply electrical power to the power grid at an adjusted frequency that is different than the nominal frequency and at a nominal amplitude that is different than the adjusted amplitude.

Another aspect of the disclosed embodiments is a method for coordinating supply of electrical power to a power grid. The method includes transmitting a first command to each vehicle from a first vehicle group that, when processed, causes each vehicle from the first vehicle group to supply electrical power to the power grid at a nominal frequency and at an adjusted amplitude. The method also includes transmitting a second command to each vehicle from a second vehicle group that, when processed, causes each vehicle from the second group to supply electrical power to the power grid at an adjusted frequency that is different than the nominal frequency and at a nominal amplitude that is different than the adjusted amplitude.

Another aspect of the disclosed embodiments is a system for coordinating supply of electrical power from a first vehicle group of one or more vehicles that are connected to a power grid and a second vehicle group of one or vehicles that are connected to the power grid. The system includes a vehicle-to-grid controller that is operable to determine a transmission distance for each of a plurality of vehicles, assign each vehicle from the plurality of vehicles to one of the first vehicle group or the second vehicle group based on the respective transmission distance for each vehicle, transmit a first command to each vehicle from the first vehicle group that, when processed, causes each vehicle from the first vehicle group to supply electrical power to the power grid at a nominal frequency and at an adjusted amplitude, and transmit a second command to each vehicle from the second vehicle group that, when processed, causes each vehicle from the second group to supply electrical power to the power grid at an adjusted frequency that is different than the nominal frequency and at a nominal amplitude that is different than the adjusted amplitude.

BRIEF DESCRIPTION OF THE DRAWINGS

The description herein makes reference to the accompanying drawings wherein like reference numerals refer to like parts throughout the several views, and wherein.

DETAILED DESCRIPTION

In vehicle-to-grid systems, each electric vehicle will connect to the grid at a certain distance from a power source. This distance is referred to herein as a transmission distance. When the transmission distance is long, there can be a great loss of power due to transmission line impedance. When the electric vehicle supplies power to the power grid at a high frequency, such as at a frequency much higher than the line frequency of the transmission lines, the transmission line impedance produces voltage fluctuations and power loss due to the high frequency and reactance over the long distance. This diminishes the effect of the electric vehicle's participation in the vehicle-to-grid system.

Figure 1:
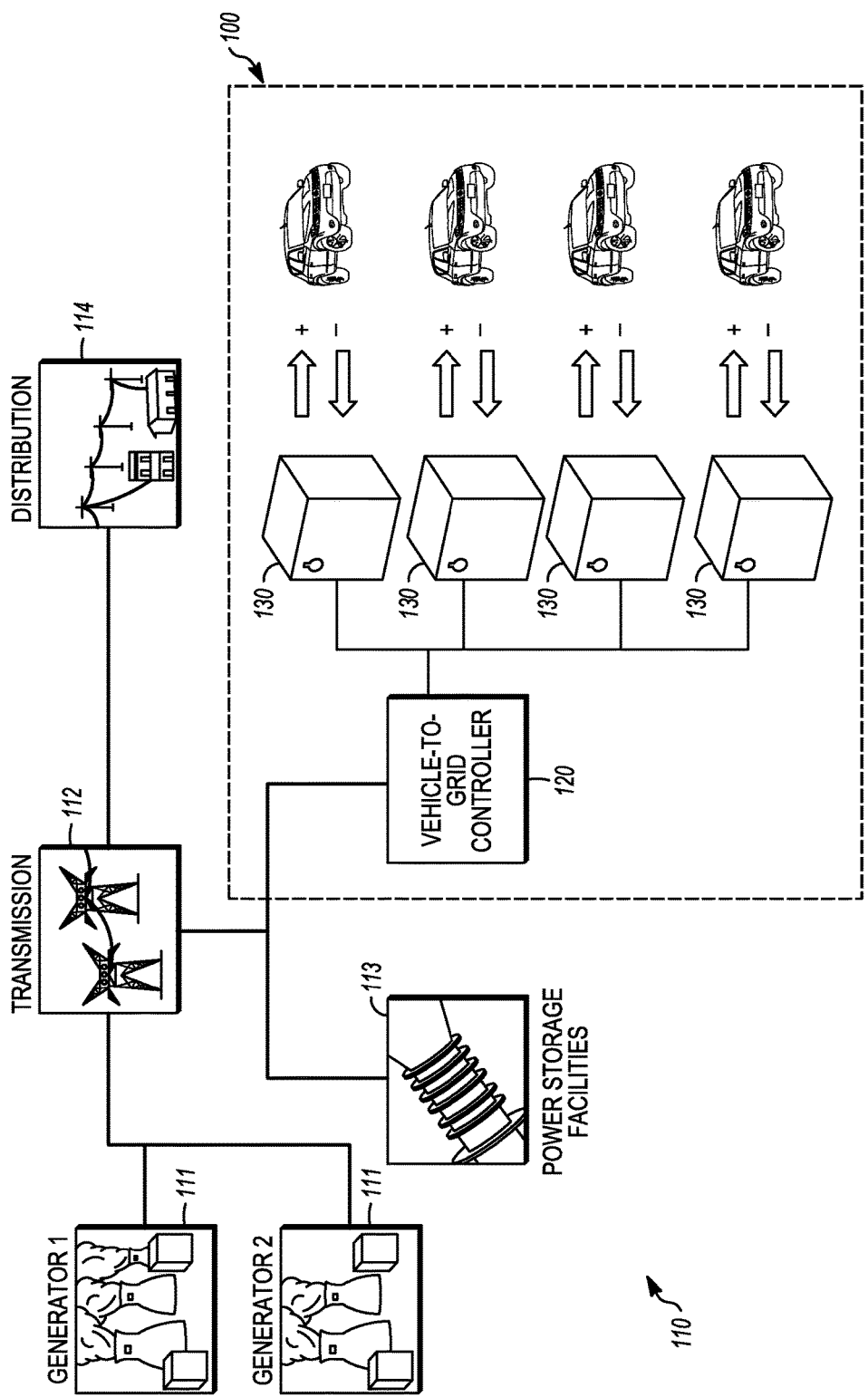
FIG. 1 is an illustration showing a vehicle-to-grid system and an example power grid.

FIG. 1 shows a vehicle-to-grid system 100 and an example of an environment in which the vehicle-to-grid system 100 can be implemented. In the illustrated example, the vehicle-to-grid system 100 is implemented in the context of a power grid 110. Although the vehicle-to-grid system 100 can be implemented in the context of a power grid of any type of configuration, a typical power grid can include one or more power generation facilities 111 that generate and supply electrical power, a transmission network 112 that includes long-distance power lines, one or more power storage facilities 113 that receive and store electrical power when supply exceeds demand and return electrical power to the grid when demand exceeds supply, and a distribution network 114 that receives electrical power from the transmission network 112 and distributes electrical power to consumers such as businesses and homes.

The vehicle-to-grid system 100 includes a vehicle-to-grid controller 120, which may also be referred to herein as a controller. The vehicle-to-grid controller 120 is in communication with a plurality of charging systems or charging stations 130. The vehicle-to-grid controller 120 is operable to receive information from the charging stations 130 and is further operable to send instructions to the charging stations 130. The instructions that are sent from the vehicle-to-grid controller 120 to the charging stations 130, when interpreted by each charging station, are operable to regulate operation of each charging station. For example, the instructions sent from the vehicle-to-grid controller 120 to the charging stations 130 can cause one or more of the charging stations to perform operations such as commencing supply of electrical power to the grid, commencing a charging operation, and altering characteristics by which power is supplied to the grid or consumed from the grid during a charging operation. The vehicle-to-grid controller 120 can be implemented in the form of a system that includes a processor that is operable to execute instructions that are stored on a computer readable storage device, such as RAM, ROM, a solid state memory device, or a disk drive. The vehicle-to-grid controller can further include a communications device for exchanging information with other computing devices via communications network.

Each of the charging stations 130 is connected to the power grid in any suitable manner, is operable to receive electrical power from the power grid 110, and is also operable to supply electrical power to the power grid 110. The charging stations 130 are further in communication with the vehicle-to-grid controller 120 for sending information to the vehicle-to-grid controller 120 and receiving information and/or instructions from the vehicle-to-grid controller 120. As explained with respect to the vehicle-to-grid controller 120, the charging stations can each include a system that includes a processor that is operable to execute instructions that are stored on a computer readable storage device, which controls operation of each charging station 130. Each of the charging stations 130 can be an on-board charging station that is disposed within the vehicle and forms a part of the vehicle or may be an off-board charging station to which the vehicle is connected by, for example, a charging cable. In both cases, the charging stations are in communication with the vehicle-to-grid controller 120 by a wired communications link or a wireless communications link, where a wireless communication link is defined where no direct wired communication connection to the charging station 130 is required.

Each of the charging stations 130 can include a power converter that is operable, for example, to convert alternating current electrical power that is received from the grid to direct current electrical power that can be used for charging the batteries of a vehicle that is connected to the charging station, as well as to convert direct current electrical power as received from the vehicle into alternating current electrical power that can be returned to the power grid. The charging stations 130 are each operable to regulate the process by which power is converted. For example, each of the charging stations 130 can control the wave form of the alternating current power that is returned to the power grid, such as by modifying the frequency and/or wavelength of the alternating current electrical power.

Figure 2:
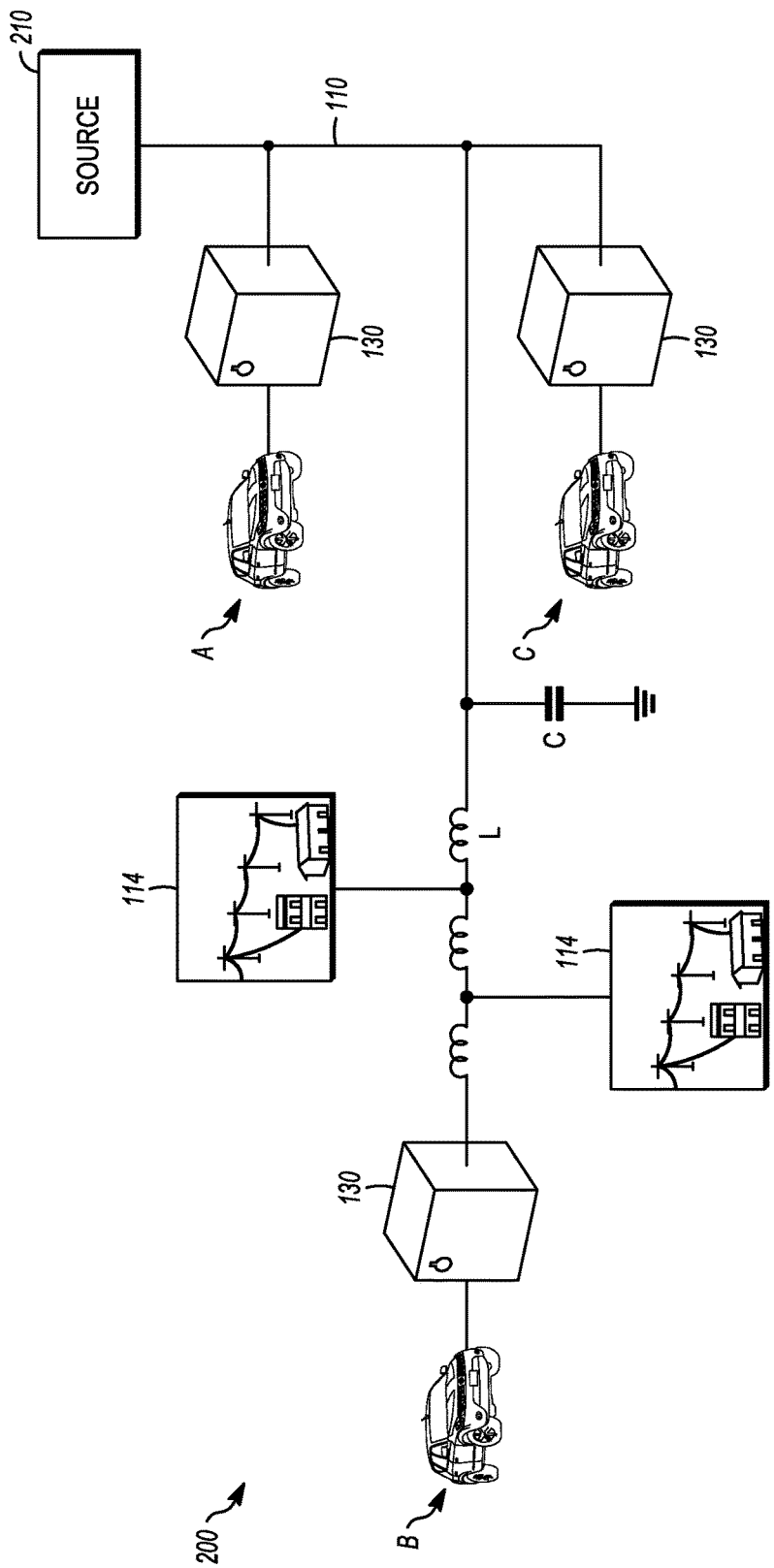
FIG. 2 is an illustration showing a first vehicle group, a second vehicle group, and a third vehicle group.

FIG. 2 is an illustration showing an example 200 in which a plurality of vehicles are connected to the power grid 110 at varying distances with respect to a facility to which each of the vehicles will return electrical power via the power grid 110. The facility is referred to herein as a source 210. Each of the vehicles that is connected to the power grid 110 has a transmission distance, which represents the distance over which electrical power provided to the power grid 110 by the vehicle travels in order to reach the source 210. In the illustrated example, vehicle A and vehicle C each have transmission distances that are far less than the transmission distance of vehicle B. Thus, vehicles A and C can be considered together as members of a first vehicle group, and vehicle B can be considered as a member of a second vehicle group, where each of the vehicle groups includes one or more vehicles, and each vehicle from the first vehicle group has a transmission distance that is less than the transmission distance of each vehicle in the second vehicle group.

Each of vehicle A, vehicle B, and vehicle C is connected to the power grid 110 by a respective one of the charging stations 130. Each of the vehicles, through its respective charging station 130, is operable to receive electrical power from the power grid 110 and is also operable to return electrical power to the power grid 110. As previously explained, the charging stations 130 are operable to control the waveform by which alternating current electrical power is returned to the power grid 110. Each of vehicle A, vehicle B, and vehicle C is operable to return power to the power grid with a nominal frequency and a nominal amplitude. The charging stations 130 are also operable to adjust the amplitude and/or the frequency at which power is supplied to the power grid 110 from the vehicles. Here, the waveform is an alternating current waveform, which can be a square wave having minimum and maximum power values.

Figure 3:
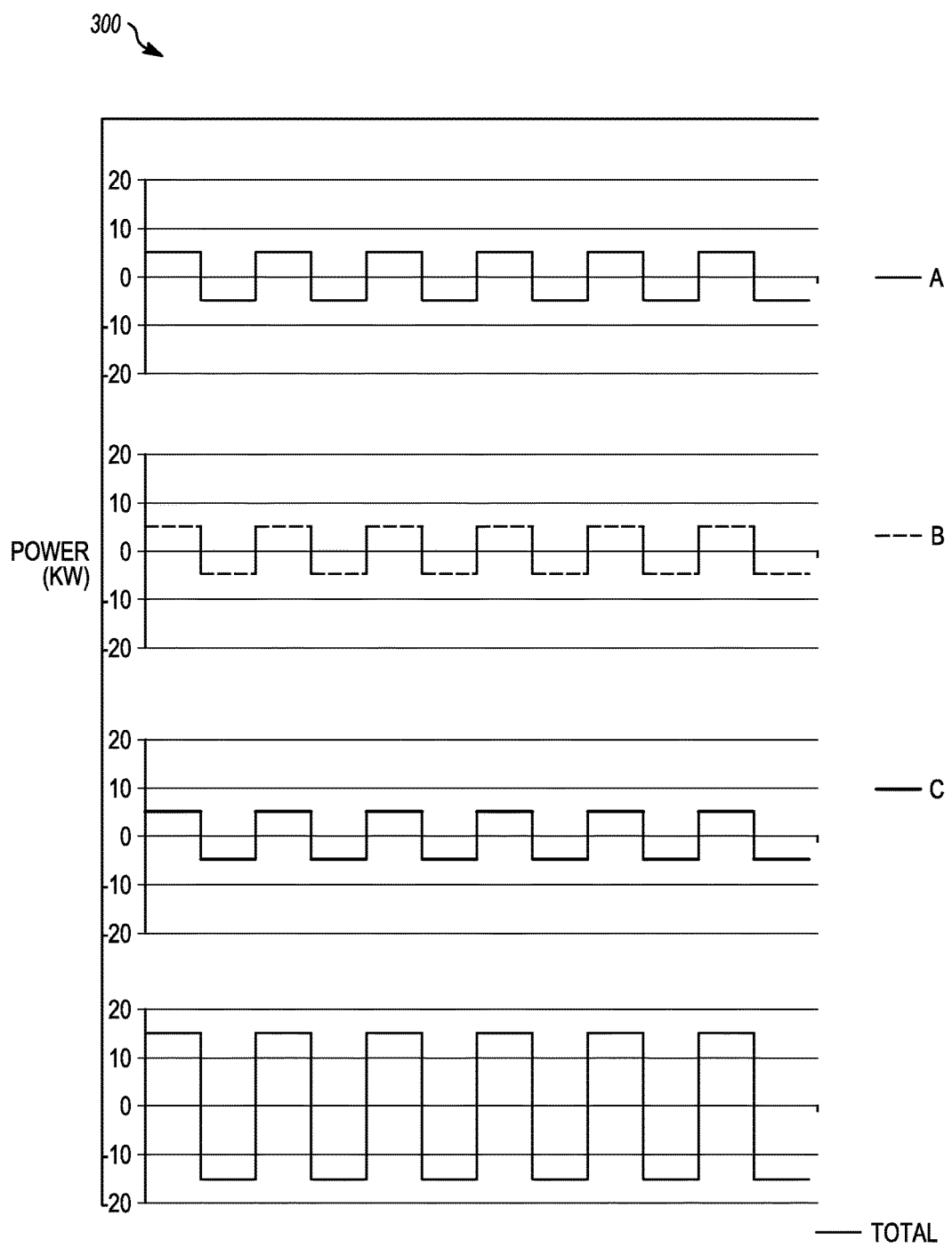
FIG. 3 is a graph showing nominal power supply waveforms for each of the first vehicle group, the second vehicle group, and the third vehicle group and a combined power supply waveform.

FIG. 3 is a graph showing nominal power supply waveforms for vehicle A, vehicle B, vehicle C, and combined electrical power resulting from combination of the electrical power supplied by each of vehicle A, vehicle B, and vehicle C. The charging stations 130 can regulate supply of electrical power to the power grid 110 by vehicle A, vehicle B, and vehicle C such that each has a nominal amplitude and a nominal frequency. In the illustrated example, the nominal amplitude for the power supplied by each of vehicle A, vehicle B, and vehicle C is 10 kilowatts, alternating from +5 kW to −5 kW. The nominal frequency of the nominal power supply waveform can be any frequency selected for supply of power to the power grid 110 by the vehicles. The nominal frequency can be a much higher frequency than the line frequency of the power grid 110. As an example, the line frequency of power grids in the United States is typically 60 Hz. As another example, power grids in Japan operate at 50 Hz or 60 Hz.

The combined electrical power returned to the power grid 110 by vehicle A, vehicle B, and vehicle C has an amplitude that is the sum of the amplitudes of the nominal power supply waveforms for the power supplied by the participating vehicles, here vehicle A, vehicle B, and vehicle C. Thus, in the illustrated example, the amplitude of the combined power supply waveform is 30 kilowatts, alternating from +15 kW to −15 kW. The frequency of the combined power supply waveform is the same as the nominal frequency of each nominal power supply waveform.

Upon determining that one or more participating vehicles has a high transmission distance, the vehicle-to-grid controller 120 can adjust the operating parameters for one or more of the charging stations 130, and thus, cause one or more of the participating vehicles to supply power to the power grid 110 according to the adjusted operating parameters. Initially, the vehicle-to-grid controller 120 assigns each of the participating vehicles to a vehicle group. Any number of vehicle groups can be established. In this example, two vehicle groups are established, namely the first vehicle group that includes vehicle A and vehicle C, and the second vehicle group that includes vehicle B. In some implementations, the vehicle groups can include large numbers of vehicles.

Figure 4:
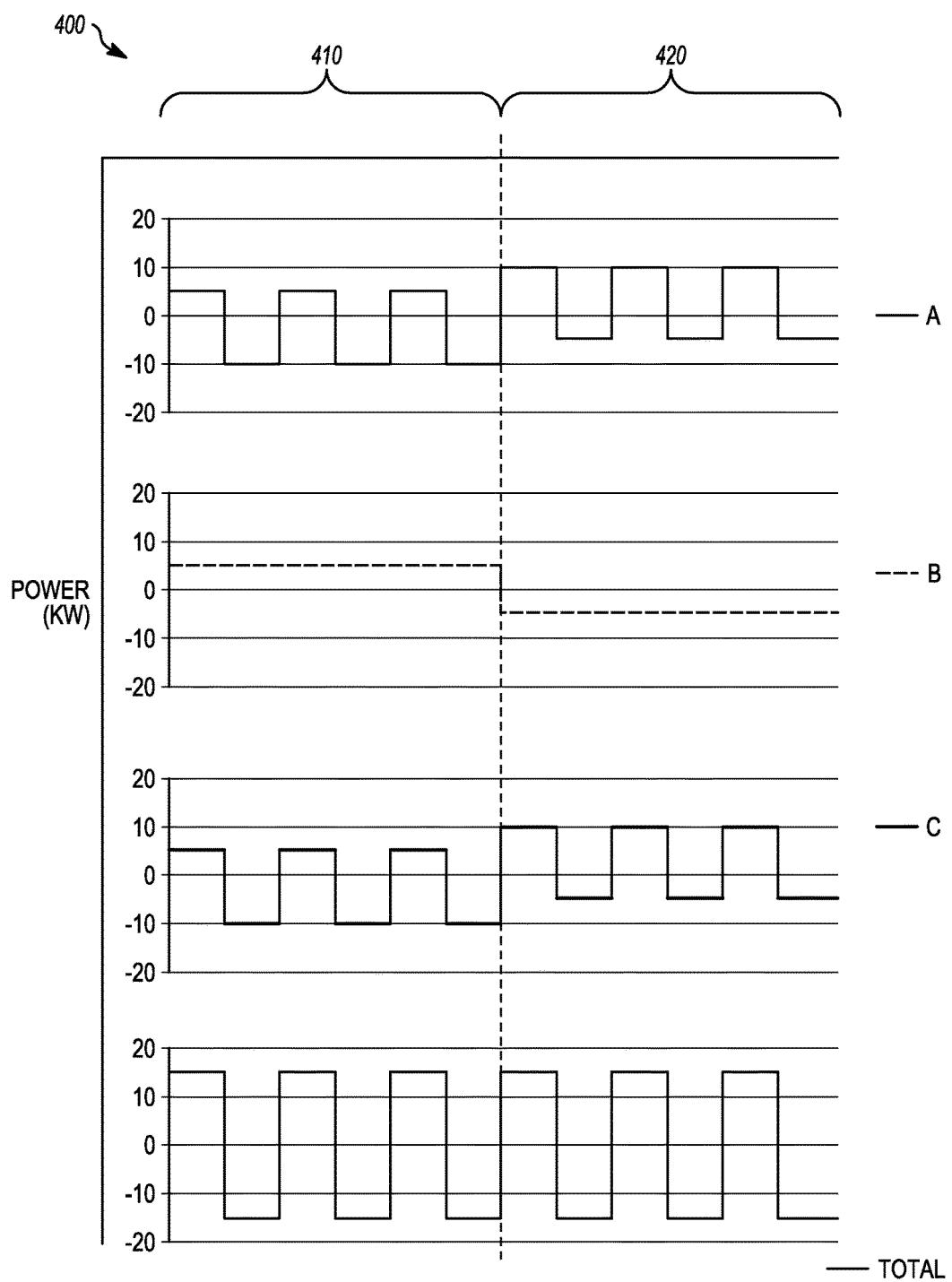
FIG. 4 is a graph showing adjusted power supply waveforms for each of the first vehicle group, the second vehicle group, and the third vehicle group and a combined power supply waveform.

FIG. 4 is a graph showing the adjusted power supply waveforms for vehicle A, vehicle B, and vehicle C, as well as the combined power supply waveform that results from the electrical power contributed to the power grid 110 by vehicle A, vehicle B, and vehicle C.

The instructions provided to the charging stations 130 from the vehicle-to-grid controller 120 cause electrical power to be supplied to the power grid 110 via a nominal frequency waveform having a higher amplitude than the nominal power supply waveforms described with respect to FIG. 3.

The nominal frequency waveform for the vehicles in the first vehicle group has different characteristics in a first time period 410 as opposed to a second time period 420. The first time period 410 and the second time period 420 correspond to a positive half-cycle and a negative half-cycle, respectively, of a low frequency waveform of the second vehicle group, as will be described in detail herein. The first time period 410 and the second time period 420 each correspond to one or more full cycles of the nominal frequency waveform. Accordingly, a single half-cycle of the low frequency waveform corresponds to one or more full cycles of the nominal frequency waveform. Thus, the nominal frequency is higher than the adjusted frequency, and the nominal frequency is an integer multiple of the adjusted frequency.

During the first time period 410, which corresponds to the positive half-cycle of the low frequency waveform, the maximum power value of the nominal frequency waveform remains at +5 kW, which is the same as the maximum power value for the nominal power supply waveforms discussed with respect to FIG. 3. The minimum power value of the nominal frequency waveform is reduced relative to the minimum power value of the nominal power supply waveforms of FIG. 3. In the illustrated example, the minimum power value for each of vehicle A and vehicle C is −10 kW.

During the second time period 420, the nominal frequency waveform has a minimum power value that is the same as described with respect to the nominal power supply waveforms of FIG. 3, namely, −5 kW. The nominal frequency waveform has an adjusted maximum power value that is increased relative to the maximum power value of the nominal power supply waveforms of FIG. 3 during the second time period 420. In the illustrated example, the increased maximum power value of the nominal frequency waveform for each of vehicle A and vehicle C is +10 kW.

As previously noted, each vehicle from the second vehicle group, namely, vehicle B, operates according to the low-frequency waveform. The low-frequency waveform is generated at the nominal amplitude. In addition, the minimum and maximum power values are the same as described with respect to the nominal power supply waveform, namely, +5 kW and −5 kW. However, the positive half-wave of the low-frequency waveform is generated during the first time period 410, while the negative half-wave of the low-frequency waveform is generating during the second time period 420. Thus, the power value of the low-frequency waveform remains at, in the illustrated example, +5 kW in the first time period 410 and at −5 kW in the second time period 420. To summarize the foregoing, the positive half-cycle of the low-frequency waveform corresponds to the first time period 410 in which the nominal frequency waveform has a reduced minimum power value relative to a minimum power value defined by the negative half-cycle of the low-frequency waveform. During the second time period 420, the nominal frequency waveform has an increased maximum power value relative to the maximum power value defined by the positive half-cycle of the low-frequency waveform.

When the electrical power supplied by the first vehicle group is combined with the electrical power supplied by the second vehicle group, combined electrical power is defined. With further reference to FIG. 4, the combined electrical power defines a waveform having the nominal frequency. In particular, since combination of the electrical power from the first vehicle group and the second vehicle group is additive, the reduction in the minimum power value of each wave of the nominal frequency waveform during the first time period balances the positive half-cycle of the low-frequency waveform that extends through the first time period 410. Likewise, the increase in the power value for each positive half-cycle of the nominal frequency waveform for each vehicle from the first vehicle group balances the effect of the negative half-cycle of the low-frequency waveform of the vehicles from the second vehicle group, which extends throughout the second time period 420. Thus, the combined power supply waveform in FIG. 4, which is generated from the adjusted waveforms for the first and second vehicle groups, is the same as the combined power supply waveform that would be generated if all of the vehicles were supplying power to the grid according to the nominal power supply waveform without losses as described in FIG. 3.

Figure 5:
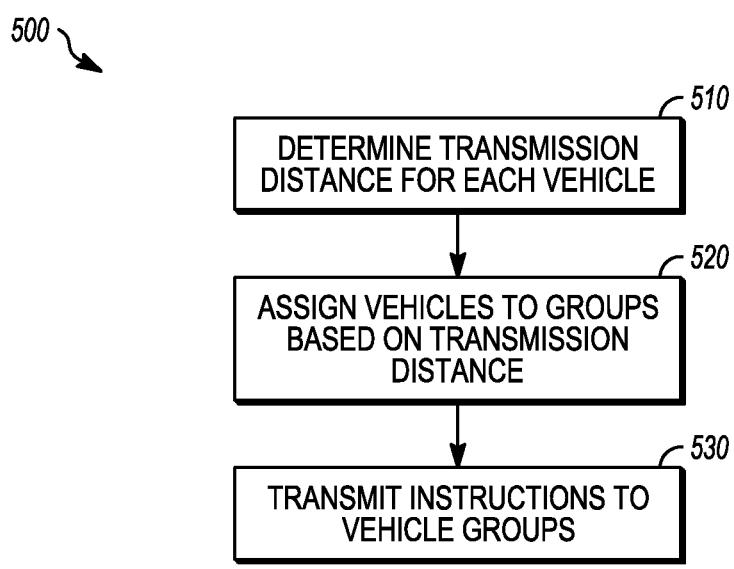
FIG. 5 is a flow chart showing a method for coordinating supply of electrical power to a power grid.

FIG. 5 shows a method 500 for coordinating supply of electrical power to a power grid. Initially, in operation 510, the vehicle-to-grid controller 120 identifies vehicles that will participate in supplying electrical power to the power grid and determines a transmission distance for each of the vehicles. As one example, the transmission distance can be a known value that is associated with each of the charging stations 130. As another example, the transmission distance can be determined by the vehicle-to-grid controller 120 based on the current location of each vehicle. As another example, the transmission distance can be estimated by calculating loss based on the difference between an expected supply of electrical power from a vehicle and the actual supply of electrical power from the vehicle.

In operation 520, the vehicle-to-grid controller 120 assigns each of the vehicles to one or more vehicle groups. The vehicles can be assigned to vehicle groups based on transmission distance. As an example, vehicles having a transmission distance that is less than the threshold value can be assigned to a first group, while vehicles having a transmission distance that is greater than the threshold value can be assigned to the second vehicle group. Although the description is made with respect to a first vehicle group and a second vehicle group, it should be understood that additional vehicle groups could be included.

In operation 530, the vehicle-to-grid controller 120 transmits instructions to each vehicle group. With reference to the example described with respect to FIGS. 2-4, the vehicle-to-grid controller 120 can transmit a first command to each vehicle from the first vehicle group that, when processed by the respective charging station 130 for each vehicle, causes each vehicle from the first vehicle group to supply electrical power to the power grid 110 at a nominal frequency and at an adjusted amplitude. The vehicle-to-grid controller 120 can transmit a second command to each vehicle from the second vehicle group that, when processed, causes each vehicle from the second vehicle group to supply electrical power to the power grid 110 at an adjusted frequency that is different from the nominal frequency and at a nominal amplitude that is different than the adjusted amplitude.

Upon receiving the instructions from the vehicle-to-grid controller 120, the vehicles from the first and second vehicle groups supply electrical power to the power grid 110 according to the received instructions. As previously described, this causes the electrical power supplied by the first vehicle group, when combined with the electrical power supplied by the second vehicle group, to defined combined electrical power having the nominal frequency. Accordingly, the power losses normally associated with the long transmission distance of the vehicles in the second vehicle group can be reduced while maintaining the nominal power supply waveform.

While the description herein is made with respect to specific implementations, it is to be understood that the invention is not to be limited to the disclosed implementations but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle-to-grid system connected to a power grid, comprising:
   a first vehicle group of one or more vehicles connected to the power grid;
   a second vehicle group of one or more vehicles connected to the power grid; and
   a vehicle-to-grid controller that causes each vehicle from the second vehicle group to supply electrical power to the power grid at a nominal frequency and at an adjusted amplitude, and causes each vehicle from the first vehicle group to supply electrical power to the power grid at an adjusted frequency that is lower than the nominal frequency and at a nominal amplitude that is different than the adjusted amplitude, wherein a respective transmission distance for each of the one or more vehicles from the first vehicle group is greater than a respective transmission distance each of the one or more vehicles from the second vehicle group.

2. The vehicle-to-grid system of claim 1, wherein the electrical power supplied by the first vehicle group, when combined with the electrical power supplied by the second vehicle group, defines combined electrical power having the nominal frequency.

3. The vehicle-to-grid system of claim 1, wherein the adjusted frequency is lower than the nominal frequency.

4. The vehicle-to-grid system of claim 1, wherein each vehicle from the first vehicle group supplies electrical power to the power grid using a low frequency waveform, each vehicle from the second vehicle group supplies electrical power to the power grid using a nominal frequency waveform, and a single half-cycle of the low frequency waveform corresponds to one or more full cycles of the nominal frequency waveform.

5. The vehicle-to-grid system of claim 4, wherein the low frequency waveform has a positive half-cycle and a negative half-cycle, the nominal frequency waveform has a reduced minimum power value relative to the low frequency waveform during the positive half-cycle of the low frequency waveform, and the nominal frequency waveform has an increased maximum power value relative to the low frequency waveform during the negative half-cycle of the low frequency waveform.

6. The vehicle-to-grid system of claim 1, wherein each vehicle from the first vehicle group has a respective first transmission distance with respect to the power grid, each vehicle from the second vehicle group has a respective second transmission distance with respect to the power grid, and the respective first transmission distance is greater than the respective second transmission distance.

7. The vehicle-to-grid system of claim 1, wherein each vehicle from the first vehicle group and each vehicle from the second vehicle group includes an on-board charging system that receives commands from the vehicle-to-grid controller.

8. The vehicle-to-grid system of claim 7, wherein the on-board charging system of each vehicle from the first vehicle group and each vehicle from the second vehicle group receives the commands from the vehicle-to-grid controller via at least one of a wired communications link or a wireless communications link.

9. The vehicle to grid system of claim 1, wherein each vehicle from the first vehicle group and each vehicle from the second vehicle group is connected to a respective off-board vehicle charging station that receives commands from the vehicle-to-grid controller.

10. The vehicle-to-grid system of claim 9, wherein the respective off-board vehicle charging station for each vehicle from the first vehicle group and each vehicle from the second vehicle group receives the commands from the vehicle-to-grid controller via at least one of a wired communications link or a wireless communications link.

11. A method for coordinating supply of electrical power to a power grid, comprising:
    transmitting a first command to each vehicle from a first vehicle group that, when processed, causes each vehicle from the first vehicle group to supply electrical power to the power grid at a nominal frequency and at an adjusted amplitude; and
    transmitting a second command to each vehicle from a second vehicle group that, when processed, causes each vehicle from the second group to supply electrical power to the power grid at an adjusted frequency that is lower than the nominal frequency and at a nominal amplitude that is different than the adjusted amplitude, wherein a respective transmission distance for each of the one or more vehicles from the first vehicle group is greater than a respective transmission distance each of the one or more vehicles from the second vehicle group.

12. The method of claim 11, further comprising:
    determining a transmission distance for each of a plurality of vehicles; and
    assigning each vehicle from the plurality of vehicles to one of the first vehicle group or the second vehicle group based on the respective transmission distance for each vehicle.

13. The method of claim 11, wherein the electrical power supplied by the first vehicle group, when combined with the electrical power supplied by the second vehicle group, defines combined electrical power having the nominal frequency.

14. The method of claim 11, wherein the adjusted frequency is lower than the nominal frequency.

15. A system for coordinating supply of electrical power from a first vehicle group of one or more vehicles that are connected to a power grid and a second vehicle group of one or more vehicles that are connected to the power grid, the system comprising:
 a vehicle-to-grid controller that is operable to:
  determine a transmission distance for each of a plurality of vehicles,
  assign each vehicle from the plurality of vehicles to one of the first vehicle group or the second vehicle group based on the respective transmission distance for each vehicle,
  transmit a first command to each vehicle from the first vehicle group that, when processed, causes each vehicle from the first vehicle group to supply electrical power to the power grid at a nominal frequency and at an adjusted amplitude, and
  transmit a second command to each vehicle from the second vehicle group that, when processed, causes each vehicle from the second group to supply electrical power to the power grid at an adjusted frequency that is different than the nominal frequency and at a nominal amplitude that is lower than the adjusted amplitude, wherein a respective transmission distance for each of the one or more vehicles from the first vehicle group is greater than a respective transmission distance each of the one or more vehicles from the second vehicle group.

16. The system of claim 15, wherein the electrical power supplied by the first vehicle group, when combined with the electrical power supplied by the second vehicle group, defines combined electrical power having the nominal frequency.

17. The system of claim 15, wherein the adjusted frequency is lower than the nominal frequency.

* * * * *